US010360410B2

(12) United States Patent
Cahana et al.

(10) Patent No.: US 10,360,410 B2
(45) Date of Patent: Jul. 23, 2019

(54) PROVIDING CONTAINERS ACCESS TO CONTAINER DAEMON IN MULTI-TENANT ENVIRONMENT (71) Applicant: International Business Machines Corporation, Armonk, NY (US)

(72) Inventors: Zvi Cahana, Nahariya (IL); Etai Lev-Ran, Nofit (IL); Idan Zach, Givat Ela (IL)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 15/350,120

(22) Filed: Nov. 14, 2016

(65) Prior Publication Data
US 2018/0137296 A1 May 17, 2018

(51) Int. Cl.
G06F 21/62 (2013.01)
G06F 21/53 (2013.01)

(52) U.S. Cl.
CPC ............ G06F 21/629 (2013.01); G06F 21/53 (2013.01)

(58) Field of Classification Search
CPC ........ G06F 21/629; G06F 21/53; G06F 9/455; G06F 9/45558; H04L 63/08; H04L 63/101; H04L 63/20
See application file for complete search history.

(56) References Cited

U.S. PATENT DOCUMENTS 8,468,548 B2   6/2013  Kulkarni et al.
9,342,357 B2   5/2016  Grueneberg et al.
9,729,579 B1 * 8/2017  Marino ................... H04L 63/20
10,015,132 B1 * 7/2018  Qin ...................... H04L 61/2592
10,037,424 B1 * 7/2018  Guenther ................ G06F 21/53
(Continued)

FOREIGN PATENT DOCUMENTS

CN    105069353    11/2015
CN    105160269    12/2015
(Continued)

OTHER PUBLICATIONS

Tim Gross., "Antipatterns for service discovery in Docker", Can be found at: https://www.joyent.com/blog/container-native-discovery, p. 2, Oct. 29, 2015.
(Continued)

Primary Examiner — Ali S Abyaneh
Assistant Examiner — Alexander R Lapian
(74) Attorney, Agent, or Firm — Barry Blount (57) ABSTRACT An example system includes a plurality of containers associated with a plurality of tenants. The plurality of containers are to execute code in isolation for the associated plurality of tenants. The system also include a container daemon communicatively coupled to the plurality of containers via an internal proxy. The container daemon is to provide a service to the plurality of containers. The internal proxy is to receive a daemon access policy. The internal proxy is to further intercept a daemon command from a container. The internal proxy is to detect that the container is allowed access to the container daemon based on the daemon access policy. The internal proxy is to also generate a modified daemon command and forward the modified daemon command to the container daemon.

20 Claims, 7 Drawing Sheets (56) References Cited

U.S. PATENT DOCUMENTS

| | | | |
|---|---|---|---|
| 2012/0331461 A1* | 12/2012 | Fries | H04L 67/2861 718/1 |
| 2016/0150053 A1* | 5/2016 | Janczuk | H04L 67/1097 709/217 |
| 2016/0239343 A1* | 8/2016 | Holt | G06F 9/485 |
| 2017/0177860 A1* | 6/2017 | Suarez | G06F 21/31 |
| 2018/0091555 A1* | 3/2018 | Chen | H04L 63/101 |
| 2018/0123954 A1* | 5/2018 | Jiang | H04L 45/64 |

FOREIGN PATENT DOCUMENTS

| | | |
|---|---|---|
| WO | 2015126292 | 8/2015 |
| WO | 2016086111 | 6/2016 |

OTHER PUBLICATIONS

Harry Zhang and Pengfei Ni., "Hypernetes: Bringing Security and Multi-tenancy to Kubernetes", An open source system for automating deployment, scaling, and operations of applications, May 24, 2016.

* cited by examiner

PROVIDING CONTAINERS ACCESS TO CONTAINER DAEMON IN MULTI-TENANT ENVIRONMENT

BACKGROUND

The present techniques relate to providing containers access to a container daemon. More specifically, the techniques relate to providing containers access to a container daemon in a multi-tenant environment.

SUMMARY

According to an embodiment described herein, a system can include a plurality of containers associated with a plurality of tenants. The plurality of containers can execute code in isolation for the associated plurality of tenants. The system can also include a container daemon communicatively coupled to the plurality of containers via an internal proxy. The container daemon can provide a service to the plurality of containers. The internal proxy can receive a daemon access policy. The internal proxy can also intercept a daemon command from a container in the plurality of containers. The internal proxy can also detect that the container is allowed access to the container daemon based on the daemon access policy. The internal proxy can also generate a modified daemon command and forward the modified daemon command to the container daemon.

According to another embodiment described herein, a computer-implemented method can include receiving, via an internal proxy, a daemon access policy. The method can also further include intercepting, via the internal proxy, a daemon command from a container. The method can also include detecting, via the internal proxy, that the container is allowed daemon access based on the daemon access policy. The method can also include modifying, via the internal proxy, the daemon command and forwarding the modified daemon command to a container daemon.

According to another embodiment described herein, a computer program product for can include computer-readable storage medium having program code embodied therewith. The computer readable storage medium is not a transitory signal per se. The program code is executable by a processor to cause the processor to receive a daemon access policy. The program code can also cause the processor to intercept a daemon command from a container. The program code can also cause the processor to detect that a container is allowed access to a container daemon based on the daemon access policy. The program code can also cause the processor to generate a modified daemon command and forward the modified daemon command to the container daemon. The program code can also cause the processor to also further receive data in response to the modified command. The program code can also cause the processor to modify the data to generate a modified data. The program code can also cause the processor to forward the modified data to the container.

DETAILED DESCRIPTION

There are multiple vendors currently providing Containers as a Service (CaaS) to their customers. The container service provides both container management infrastructure as well as computing resources to run a customer's workload. A container, as used herein, refers to an isolated execution environment that may share the same kernel of an operating system via any suitable form of operating-system-level virtualization. For example, services such as scheduling, monitoring, and user interfaces may be provided as well as the servers or virtual machines to run the services. In multitenant management infrastructures, varying degrees of resource sharing may be provided. For example, fully dedicated resources may provide container services that schedule containers on a private cluster of virtual machines dedicated to each customer. In some examples, fully shared container services may share hosts between containers running on behalf of different tenants.

In shared multitenant environments, vendors may limit the container's capabilities and access to the host machine in order to enforce security or resource constraints. For example, containers may be prevented from accessing the host's container daemon because providing access to the container daemon may violate any separation set between different tenants. A container daemon, as used herein, refers to a computer program that runs on the machine and is responsible for managing containers and containers access. Vendors thus provide safe external access to the daemon by proxying user requests coming from outside a computing host and thus validating user access credentials and capabilities. Moreover, containers running on the host are also prevented from making any calls to the daemon.

However, the popularity of containers has spawned an ecosystem of tools, providing additional capabilities and value-added services for running and managing containerized applications. For example, such tools include runtime monitoring and visualization agents, automation tools and orchestration tools. These tools may use direct access to the container daemon to control and inspect containers, and listen to lifecycle events, etc. Thus, such tools may not be able to be run directly on a shared multitenant environment. Instead, each tool is typically individually modified and adapted to run on the shared compute infrastructure. For example, each tool is modified to become tenant aware to enforce control and monitoring boundaries between tenants. This may be a labor intensive and error-prone process that greatly limits the availability of tools and, consequently, may hinder adoption of multitenant CaaS systems more generally.

According to embodiments of the present techniques, a system may include a plurality of containers associated with a plurality of tenants communicatively coupled to a proxy endpoint. An endpoint, as used herein, refers to a communication endpoint. An endpoint can include, for example, any form of communication endpoint, such as a socket. The plurality of containers may execute code for the plurality of tenants in isolation. In some examples, the plurality of containers may host private, per-tenant, artifacts that require protection. For example, the artifacts may include customized file systems, services, or any other software products. The system may also include a container daemon communicatively coupled to the internal proxy via a container endpoint. For example, the container daemon may provide a service to the plurality of containers. The system may further include an internal proxy communicatively coupled to the proxy endpoint and the container endpoint, the internal proxy to receive a daemon access policy. The internal proxy may also intercept a daemon command from a container. The internal proxy may further detect that the container is allowed access to the daemon based on the daemon access policy. The internal proxy may then modify the daemon command and forward to the daemon. Thus, the techniques may enable containers to be provided with the illusion of direct daemon access, while the internal proxy can enforce any security and isolation needed between tenants in a generic way. For example, the internal proxy may use namespace separation, access control validation, or any other suitable security or isolation techniques. Thus, the techniques provide an improved tradeoff between security and functionality. For example, decisions may be made based on per tenant and per operation basis. Furthermore, the techniques are generic and thus do not require per tool adaptation.

In some scenarios, the techniques described herein may be implemented in a cloud computing environment. As discussed in more detail below in reference to at least FIGS. 4, 5, and 6, a computing device configured to provide containers access to a container daemon via an internal proxy may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
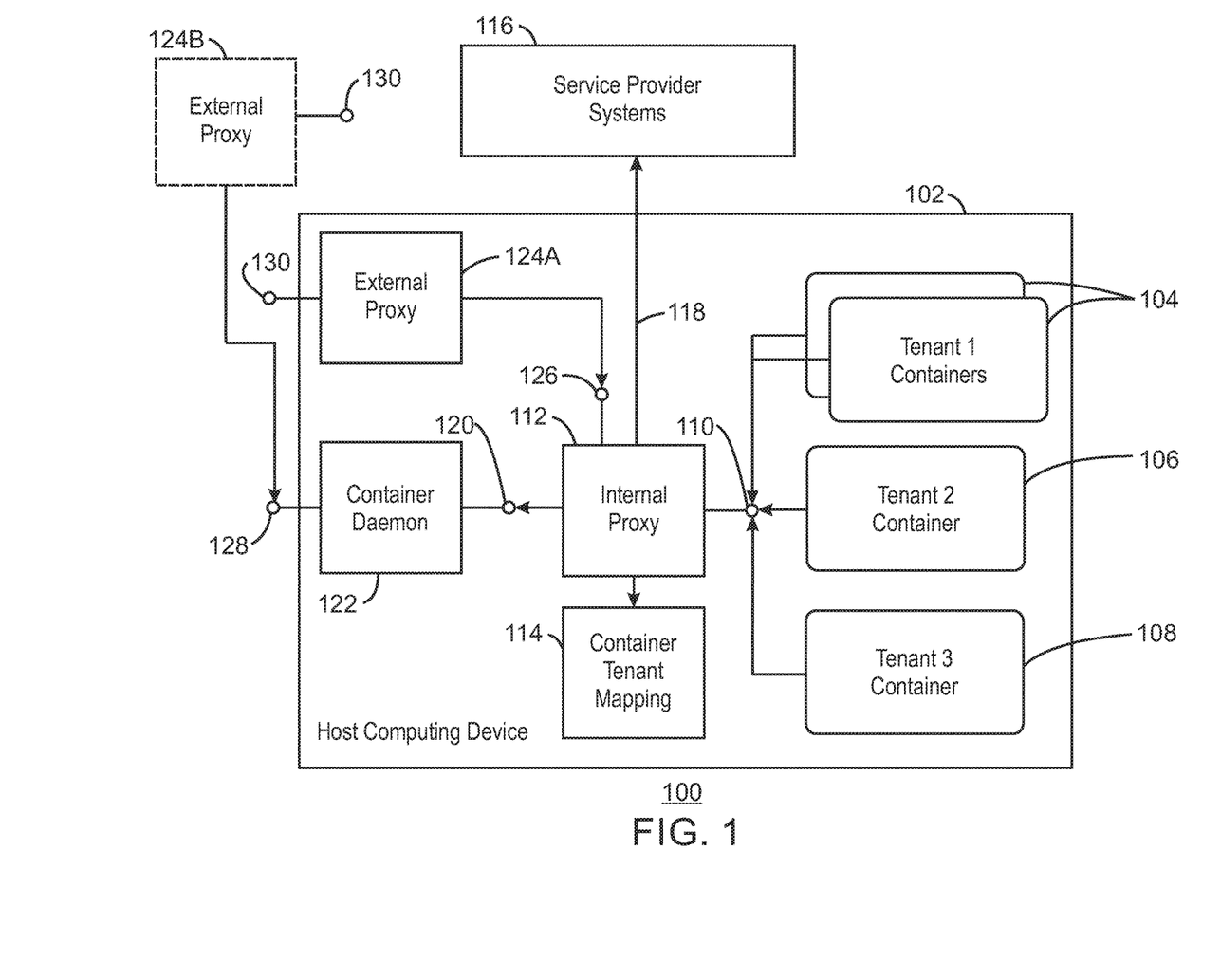
FIG. 1 is a block diagram of an example system that can provide containers access to a container daemon via an internal proxy.

FIG. 1 is a block diagram of an example system that can provide containers access to a container daemon via an internal proxy. The system is generally referred to using the reference number 100 and can be implemented at least in part using the computing device 400 of FIG. 4 below. As used in FIG. 1, arrows indicate a direction of connection establishment. However, the communication along arrows may be bidirectional and thus proceed in either direction.

The example system 100 includes a host computing device 102 including a number of containers 104, 106, 108 associated with respective tenants. For example, containers 104 may be associated with one tenant, container 106 may be associated with another tenant, and container 108 may be associated with a third tenant. In some examples, the host computing device 102 may be a physical server or a virtual server. The host computing device 102 includes a proxy endpoint 110 to couple the containers 104, 106, 108 to an internal proxy 112. For example, the internal proxy may be an internal application programming interface (API) proxy. The internal proxy 112 is also coupled to a container tenant mapping 114 that may be used to map one or more containers to a tenant. For example, containers 104 may be mapped to a single tenant, container 106 may be mapped to a second tenant, and container 108 may be mapped to a third tenant. The internal proxy 112 may also be communicatively coupled to service provider system 116 via connection 118. For example, the connection 118 may be a communication link, such as a socket or URL, to service provider systems. The internal proxy 112 is further coupled to a daemon endpoint 120 coupled to a container daemon 122. In some examples, an external proxy 124A may be coupled at the remote API 126 of the internal proxy 112. For example, the external proxy 124A may provide access to container functionality to external computing devices. Alternatively, in some examples, as indicated by broken lines, an external proxy 124B may instead be coupled to the container daemon 122 via a remote API 128 of the container daemon 122. In some examples, the external proxy 124A or 124B may be a gateway or an external application programming interface (API) proxy. The external proxy 124A, 124B may also have an interface 130 for remote access.

In the example system 100, a host computing device 102 running container-as-a-service (CaaS) functionality may thus be running a container daemon to provide the CaaS functionality. The container functionality may be exported to users via an external proxy 124A or 124B. The external proxy 124A, 124B may run on each host 124A or centrally 124B. For example, the external proxy 124B may leverage a container daemon's remote API 126. The proxy is responsible for providing an isolated view to each tenant, ensuring they have access to their own containers and associated resources. The host computing device 102 may also run the internal proxy 112 to mediate access from the containers 104, 106, 108 to the container daemon 122. The internal proxy 112 thus provides access to the container daemon 122 for containers 104, 106, 108 in a multi-tenant environment running on the host computing device 102. The external proxy 124A, 124B provides container function to users (not shown) remote to the host computing device 102.

In some examples, the internal proxy 112 can connect to the daemon endpoint 120 of the host computing device 102. The internal proxy 112 may then monitor incoming connections on a proxy endpoint 110 having a different path. In some examples, the internal proxy 112 may listen on a single proxy endpoint 110 shared by all tenants. Similarly, the internal proxy 112 may run in one or more processes and/or threads to provide further isolation. For example, the internal proxy 112 may have different user permissions associated with each proxy process.

In some examples, since containers provide namespace isolation, the proxy endpoint 110 can be mapped to inside each container 104, 106, 108, providing expected daemon access to any application or tool running inside the respective container 104, 106, 108. Since the internal proxy 112 receives any attempted communications between the local tenant containers 104, 106, 108 and the container daemon 122, the internal proxy 112 can enforce any isolation, security, or resource policies, while remaining agnostic to the specific application making the container API call. In determining an appropriate action in response to receiving an attempted communication, the internal proxy 112 may map the request's origin container to a specific tenant 104, 106, 108. For example, containers 104 may belong to a single tenant. In some examples, the internal proxy 112 may use the mapping 114 between containers and tenants owning those containers to map the request's origin container to a specific tenant. In some examples, the mapping 114 may be a mapping that already exists in CaaS systems. In some examples, the mapping 114 may be easy to deduce from the tenant-to-container mapping used for CaaS operations. In addition, the internal proxy 112 may send requests to external sources 116 for additional data. For example, the internal proxy 112 may send a request to a service provider's support systems, such as billing and quota management. In some examples, the internal proxy 112 may send a request for a service policy to determine allowed operations. If an operation is determined to be allowed, the internal proxy 112 possibly can modify the request. For example, the internal proxy 112 can translate between a container view or namespace and a host view of the same object referred in the container's view or namespace. The internal proxy 112 can then forward the modified request to the container daemon 122 via the daemon endpoint 120. In some examples, the internal proxy 112 may also filter responses flowing back from the container daemon 122. For example, the internal proxy 112 may filter events belonging to other tenants, and map from host view/namespace to the container, etc.

In some examples, the internal proxy 112 may use namespace mapping to provide each tenant with an illusion of direct access to its respective containers 104, 106, 108. In some examples, the internal proxy 112 may map between two types of identifiers, including generated GUID's and human-assigned names. For example, running containers may be assigned a GUID by the host computing device 102 to prevent a tenant from accessing containers belonging to other tenants. The internal proxy 112 can create a translation scheme between the GUID of the host computing device 102 and the GUIDs presented to each container. In some examples, the internal proxy 112 may randomly generate container internal GUIDs and keep a table mapping host and container internal GUIDs. Alternatively, in some examples, the internal proxy 112 can use a secret key to encrypt and decrypt when translating names from host to container and vice-versa. For example, the internal proxy 112 may use a random seed hashed with the tenant identifier. Similarly, the internal proxy 112 can maintain a mapping between human assigned and readable names inside the container and their host counterpart. For example, the readable names may include container links, volumes, etc. In some examples, the internal proxy 112 may use a mapping function. For example, the internal proxy 112 can prefix all names assigned within the tenant scope with the tenant identifier, thus creating namespace separation between tenants.

In some examples, the external proxy 1248 may be running on a separate host or cluster of hosts. The external proxy 1248 could then access the container services using the remote API 128 of the container daemon 122. For example, the external proxy 1248 may access the containers services using Hypertext Transfer Protocol (HTTP) or Secure Hypertext Transfer Protocol (HTTPS) with secure communication in place. Alternatively, the external proxy 124A may communicate with the internal proxy 112 via a remote API 126 of the internal proxy 112.

In some examples, the internal proxy 112 may be used to securely proxy other host files into the containers. For example, the internal proxy 112 may map/dev/fuse to enable a per tenant user file system to run inside a container.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional proxies, tenants, containers, etc.).

Figure 2:
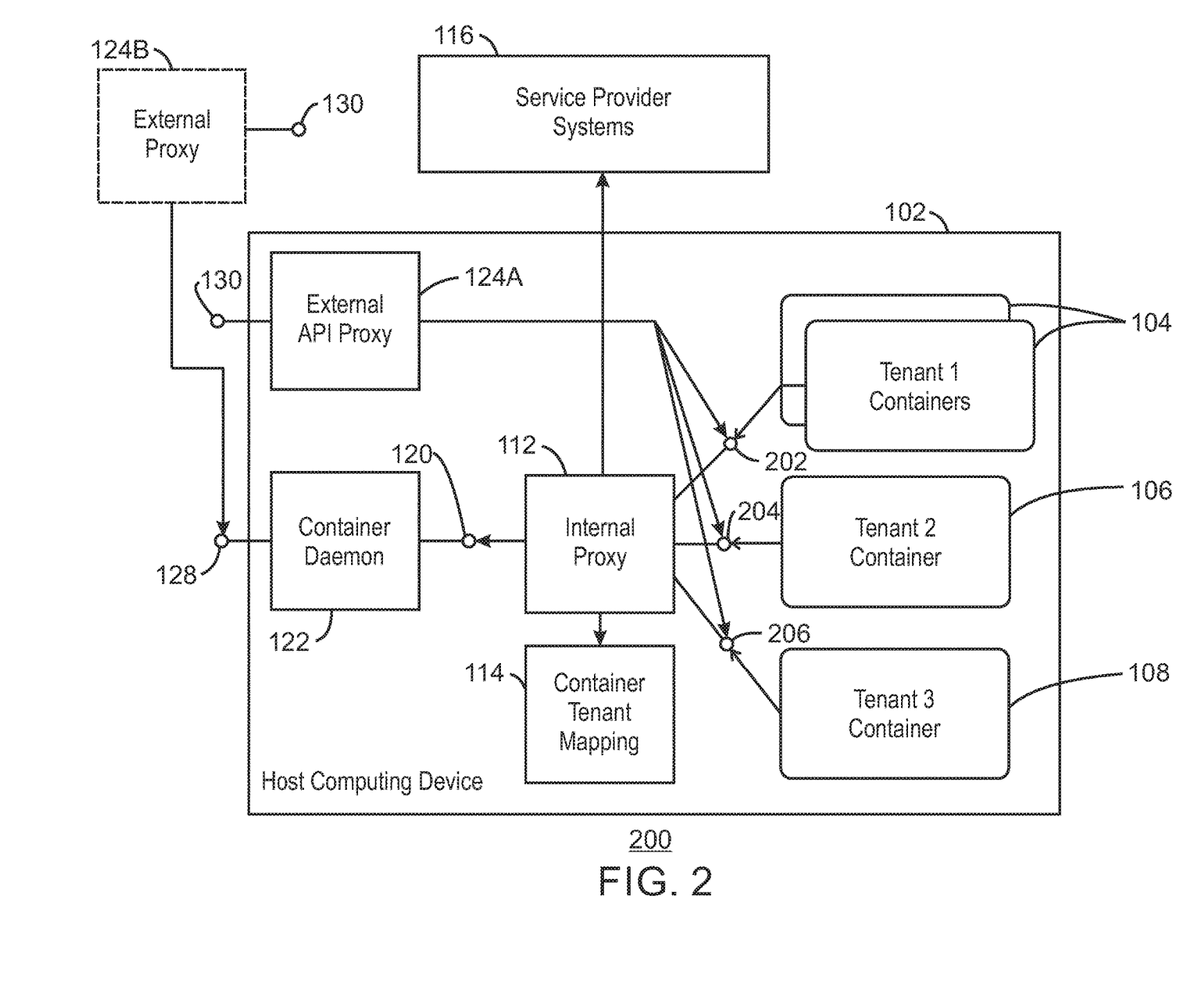
FIG. 2 is a detailed process flow diagram of another example process that can provide containers access to a container daemon via an internal proxy with dedicated endpoints.

FIG. 2 is a block diagram of an example system that can provide containers access to a container daemon via an internal proxy with dedicated endpoints. The system is generally referred to using the reference number 200 and can be implemented at least in part using the computing device 400 of FIG. 4 below. As used in FIG. 2, arrows again indicate a direction of connection establishment. However, the communication along arrows may be bidirectional and thus proceed in either direction.

The example system 200 includes the similarly numbered elements described in FIG. 1 above. The host computing device 102 further includes 200 dedicated endpoints 202, 204, 206. For example, each dedicated endpoint 202, 204, 206 may be associated with a separate tenant and one or more associated containers. Thus, containers 104 associated with a first tenant may be coupled to internal proxy 112 via a dedicated endpoint 202. Container 106 associated with a second tenant may be coupled to the internal proxy 112 via another dedicated endpoint 204. Container 108 associated with a third tenant may also be coupled to the internal proxy 112 via a separate dedicated endpoint 206. Each of the dedicated endpoints 202, 204, 206 may also be communicatively coupled with the external proxy 124A to provide container services to one or more remote users.

In the example system 200, the internal proxy 112 may listen to multiple dedicated endpoints 202. For example, instead of establishing a single listening endpoint and mapping for all tenants as in FIG. 1 above, the internal proxy 112 may instead establish a different listening endpoint for each tenant. Thus, each dedicated endpoint may be associated with one tenant. In some examples, having a different endpoint 202, 204, 206 for each tenant 104, 106, 108, respectively, may simplify the mapping 114 between containers and tenants and provide additional isolation between tenants. For example, the tenant that each container is associated with may be determined by the dedicated endpoint 202 that the container is connected to. The respective proxy endpoint 202, 204, 206 may be mapped into each respective started container 104, 106, 108.

In some examples, the external proxy 124A may also communicate with the internal proxy 112 via the dedicated endpoints 202, 204, 206, which can be securely exposed to privileged hosts. In some examples, the internal proxy can expose a remote API, and the first command exchanged can be a tenant-id binding, indicating which endpoint should be used as a target. For example, the remote API may be over any suitable protocol, such HTTP, HTTPS, transmission control protocol (TCP), etc. For example, forwarding endpoints can be set for each tenant separately such that the translation between tenant operations and their respective local endpoints is immediate and clear. This scheme has also an additional benefit of making the internal proxy 112 aware of external and internal API calls alike.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional proxies, tenants, containers, etc.).

Figure 3:
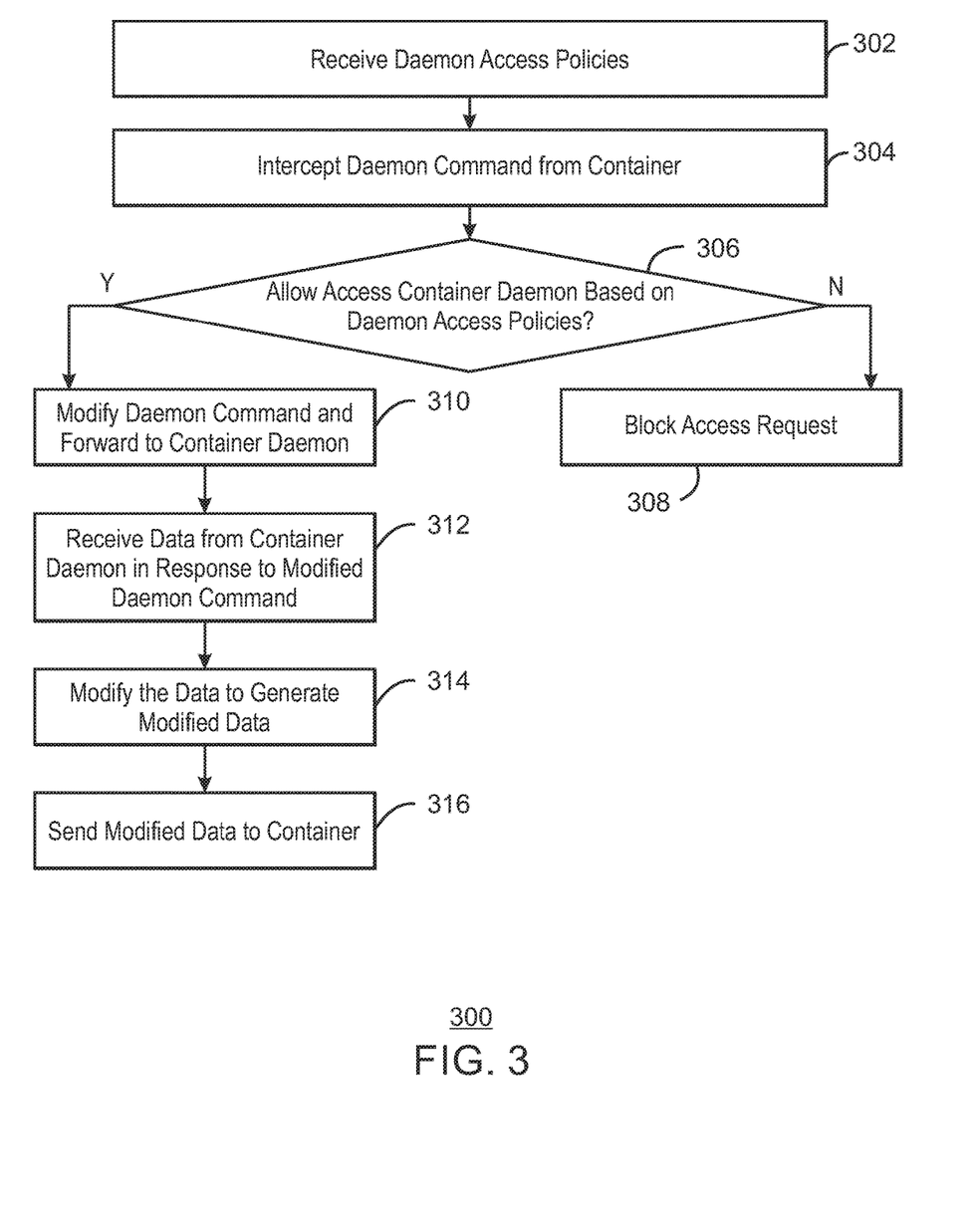
FIG. 3 is a process flow diagram of an example method that can provide containers access to a container daemon via an internal proxy.

FIG. 3 is a process flow diagram of an example method that can provide containers access to a container daemon via an internal proxy. The method 300 can be implemented with any suitable computing device, such as the computing device 400 of FIG. 4. In some examples, the method can be implemented via the internal proxy 112 of the system 100 or the system 200 above.

At block 302, the internal proxy receives a daemon access policy. As used herein, a daemon access policy may include any isolation, security, or resource policy that can be used to determine access rights for one or more containers to a container daemon. For example, the daemon access policy may be a service policy used to determine allowed operations for accessing the container daemon. In some examples, the daemon access policy may include billing and quota management information that can be used to determined allowed operations. In some examples, the daemon access policy may be used to determine visibility of resources such as containers, images, and container events. In some examples, the daemon access policy can be used to modify data received from a daemon in response to a request as discussed in block 314 below.

At block 304, the internal proxy intercepts a daemon command from a container or an external proxy. For example, the daemon command may be a request for information from a container service. In some examples, the internal proxy may monitor a dedicated endpoint that is dedicated to a single tenant. In some examples, the internal proxy may monitor a proxy endpoint that is shared by a plurality of tenants.

At block 306, the internal proxy determines whether the container is allowed access to the container daemon. For example, the internal proxy may determine whether the container is allowed access to the container daemon based on the daemon access policy. In some examples, the determination can be a course-grained determination to allow or deny access to a particular tenant. For example, the determination may be based on a service plan purchased by the particular tenant. In some examples, the determination can be a more fine-grained determination based on additional factors. For example, the determination can be based on specific access control lists, which may allow determination to be made per-tenant and per-operation. If the internal proxy detects that the container is allowed daemon access based on the daemon access policy, then the method may proceed at block 308. If the internal proxy detects that the container is not allowed daemon access based on the daemon access policy, then the method may proceed at block 310.

At block 308, the internal proxy blocks the daemon command. For example, the internal proxy may have determined that the container does not have appropriate access to the daemon and therefore will intercept the daemon command and return an appropriate error response, terminate the connection, or return an empty reply.

At block 310, the internal proxy modifies the daemon command and forwards the modified command to the daemon. In some examples, the internal proxy may modify the daemon command to generate a modified daemon command by translating between a container view or namespace and a host view of the containers. For example, the daemon command "inspect container <name>" can be modified to "inspect container <tenant>_<name>". In some examples, a fields or event requested may be modified to a different subset. For example, host-privileged fields may be excluded or renamed. The internal proxy may then forward the modified daemon command with the host view of the containers to the container daemon.

At block 312, the internal proxy receives data from the container daemon in response to the modified daemon command. For example, the data may include a list of active containers and their identifiers, metadata associated with a specific container, or a list of container images available for execution, among other possible data.

At block 314, the internal proxy modifies the data to generate modified data. In some examples, modifying the data may include filtering data of other tenants. For example, if the container invoked an operation requesting a list of all running containers, the daemon, which is not tenant-aware, may return a response including all containers managed by that daemon. The internal proxy can then filter the daemon response data to include only the containers of the same tenant that originated the request. In some examples, the internal proxy may perform additional modifications on the response data. For example, the internal proxy can rename containers and/or container labels from a host view to a container view. The internal proxy can also producing default values for privileged host fields. In some examples, the response modifications performed by the internal proxy may be subject to and determined by the daemon access policy described in block 302 above. For example, a daemon access policy may include an instruction to return only partial metadata in response to "inspect container <name>". The response may thus include a container name, an ID, a state, an internet protocol (IP) address, etc., but may not contain the container directory path on the host, etc.

At block 316, the internal proxy sends the modified data to the container. In some examples, the internal proxy may forward the data to the container using a mapping. In some examples, the internal proxy may send container functionality to a computing device via an external proxy.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
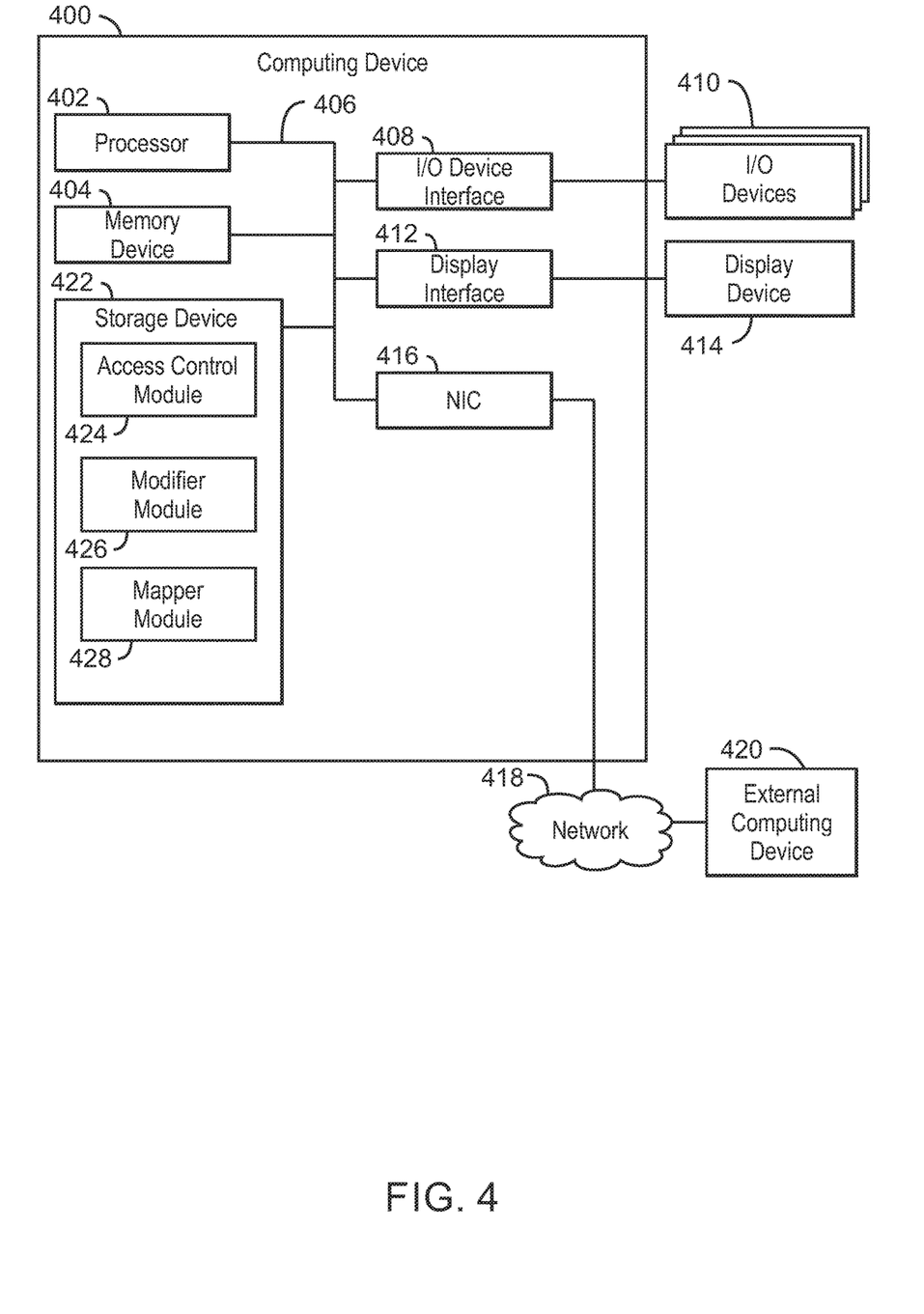
FIG. 4 is a block diagram of an example computing device that can provide containers access to a container daemon via an internal proxy.

With reference now to FIG. 4, an example computing device can provide containers access to a container daemon via an internal proxy. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include an access control module 424, a modifier module 426, and a mapper module 428. The access control module 424 can receive a daemon access policy. For example, the daemon service policy may be a service policy used to determine allowed operations. The access control module 424 can then intercept a daemon command from a container. For example, the daemon command may include a command to list containers, create a new container, inspect a container, etc. The access control module 424 can detect that the container is allowed access to the daemon based on the daemon access policy. In some examples, the access control module 424 can filter events belonging to other tenants.

The modifier module 426 can modify the daemon command and forward to the daemon. For example, the modifier module 426 can translate between a container view and a host view of the container. In some examples, the modifier module 426 can receive data from the daemon in response to the modified command, modify the data, and forward the modified data to the container. The mapper module 428 can map between the plurality of tenants and the plurality of containers.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the access control module 424, the modifier module 426, and the mapper module 428, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the access control module 424, the modifier module 426, and the mapper module 428, can be implemented with logic, wherein the logic, as referred to herein, can include any suitable hardware (e.g., a processor, among others), software (e.g., an application, among others), firmware, or any suitable combination of hardware, software, and firmware.

Figure 5:
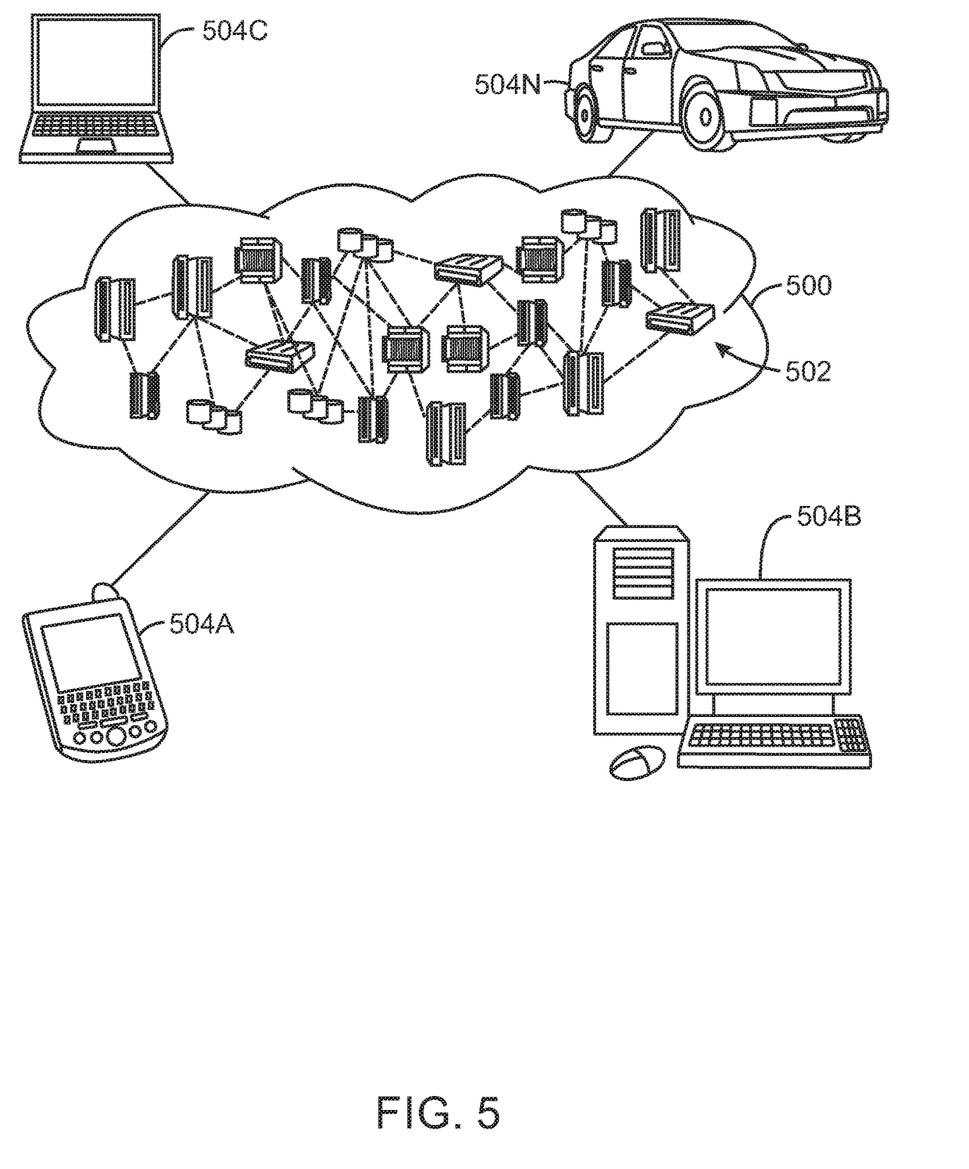
FIG. 5 is a block diagram of an example cloud computing environment according to embodiments described herein.

Referring now to FIG. 5, an illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
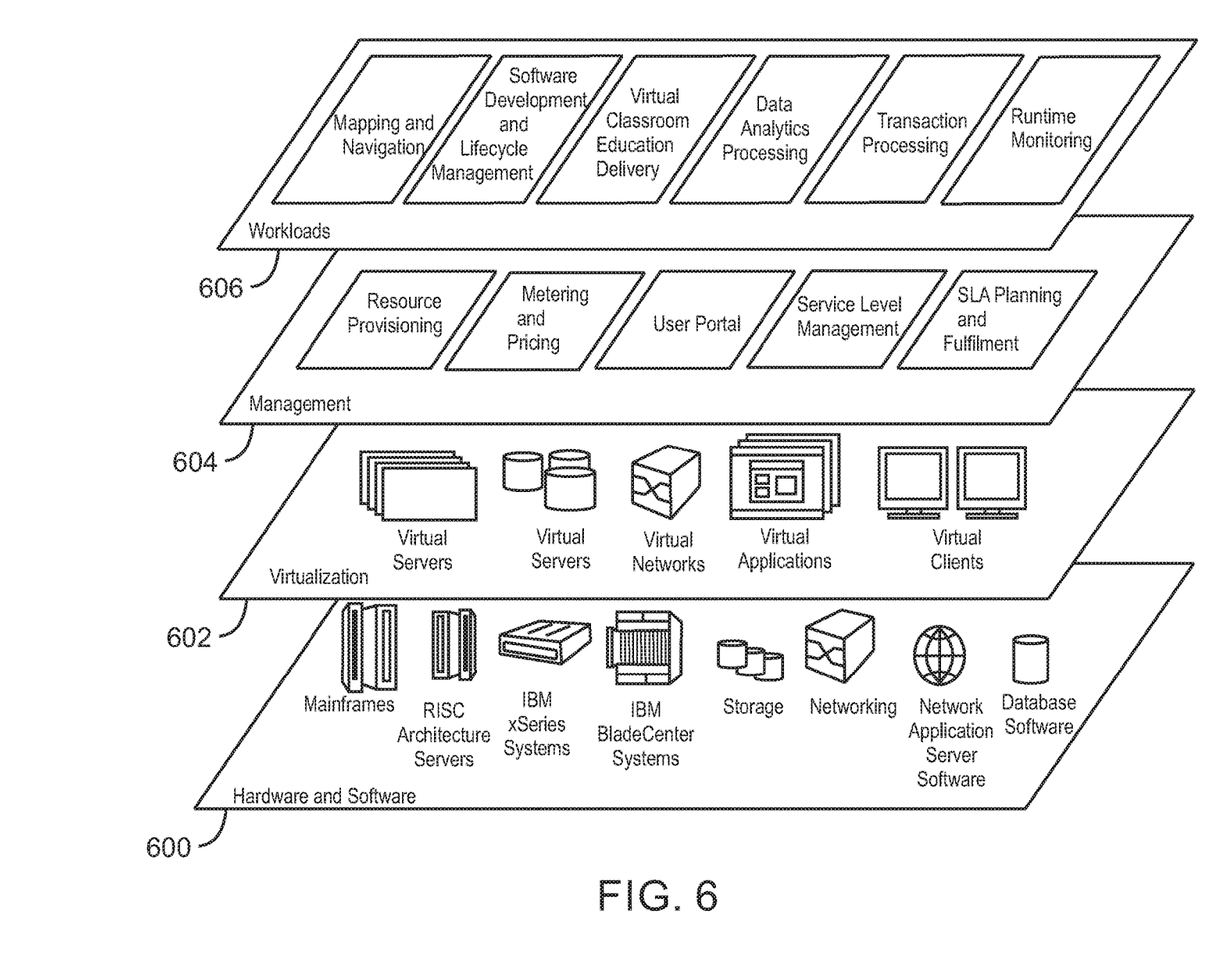
FIG. 6 is an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and runtime monitoring.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
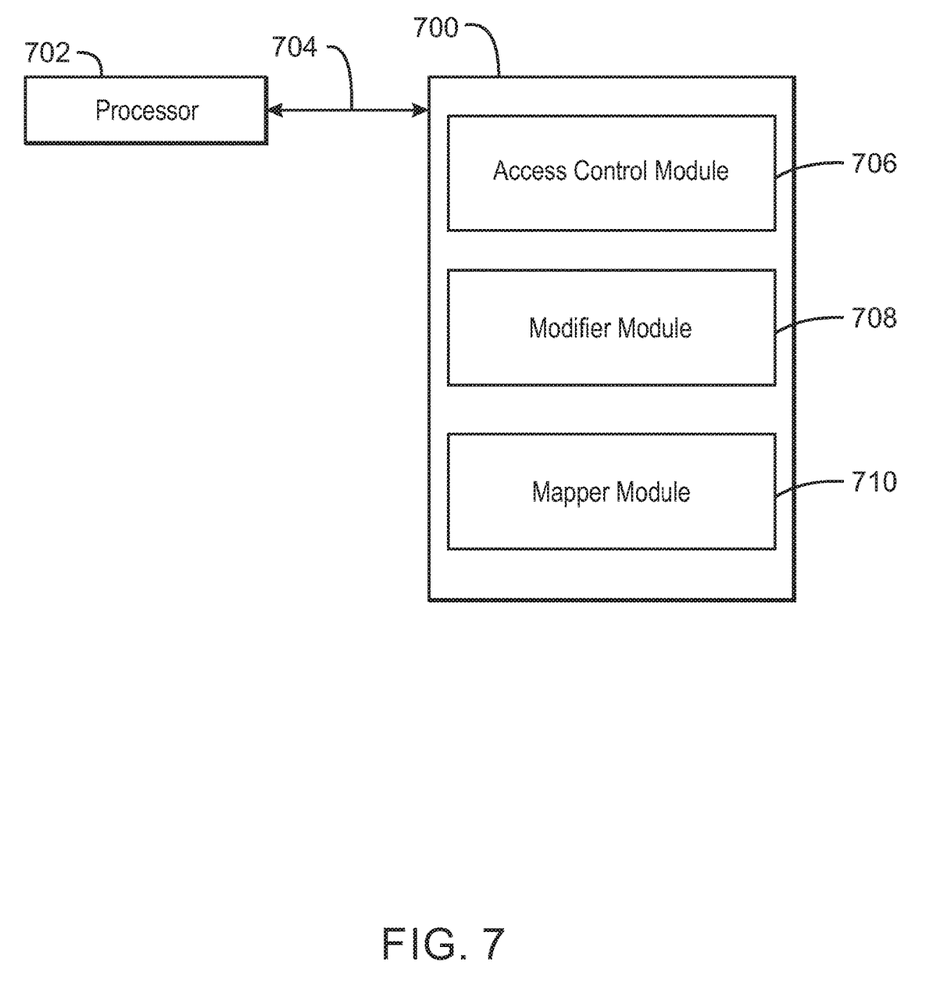
FIG. 7 is an example tangible, non-transitory computer-readable medium that can provide containers access to a container daemon via an internal proxy.

Referring now to FIG. 7, a block diagram is depicted of an example tangible, non-transitory computer-readable medium 700 that can provide containers access to a container daemon via an internal proxy. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3 above.

The various software components discussed herein may be stored on the tangible, non-transitory, computer-readable medium 700, as indicated in FIG. 7. For example, an access control module 706 includes code to receive a daemon access policy. For example, the daemon access policy may include a service policy used to determine allowed operations. The access control module 706 also includes code to intercept a daemon command from a container in a plurality of containers. For example, the access control module 706 may monitor a proxy endpoint that is shared by a plurality of containers. The access control module 706 also includes code to detect that a container is allowed access to the container daemon based on the daemon access policy. In some examples, the access control module 706 may include code to filter events belonging to other containers. A modifier module 708 includes code to generate a modified daemon command and forward the modified daemon command to the container daemon. For example, the modifier module 708 may translate between a container view and a host view of the container to generate the modified daemon command. A mapper module 710 includes code to receive data from the container daemon in response to the modified command. The modifier module 708 may then modify the data to generate modified data. The mapper module 710 may then forward the data to the container. The mapper module 710 also includes code to map a tenant to the container. In some examples, the mapper 710 may include code to map a tenant to a plurality of containers including the container. For example, mapping may indicate each of the plurality of tenants associated with each of the plurality of containers. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory device comprising a plurality of containers associated with a plurality of tenants, the plurality of containers to execute code in isolation for the associated plurality of tenants; and
a processor to execute a container daemon communicatively coupled to the plurality of containers via an internal proxy, the container daemon to provide a service to the plurality of containers, the internal proxy to cause the processor to:
receive a daemon access policy;
intercept a daemon command from a container in the plurality of containers;
detect that the container is allowed access to the container daemon based on the daemon access policy; and
generate a modified daemon command and forward the modified daemon command to the container daemon.

2. The system of claim 1, wherein the internal proxy is to receive data from the container daemon in response to the modified command, modify the data to generate modified data, and forward the modified data to the container.

3. The system of claim 1, comprising an external proxy communicatively coupled to an endpoint of the container, the external proxy to provide access to container functionality to an external computing device.

4. The system of claim 1, comprising an external proxy communicatively coupled to the container daemon, the external proxy to provide access to container functionality to an external computing device.

5. The system of claim 1, wherein the internal proxy is to generate a container tenant mapping between the plurality of tenants and the plurality of containers, the container tenant mapping indicating each of the plurality of tenants associated with each of the plurality of containers.

6. The system of claim 1, wherein the internal proxy is coupled to the plurality of containers via a plurality of dedicated container endpoints, wherein the dedicated container endpoints are to each provide access to one or more of the containers associated with a single tenant.

7. The system of claim 1, wherein the internal proxy is to run a plurality of processes, wherein each process is associated with a different user permission.

8. A computer-implemented method, comprising:
receiving, via an internal proxy, a daemon access policy;
intercepting, via the internal proxy, a daemon command from a container;
detecting, via the internal proxy, that the container is allowed daemon access based on the daemon access policy; and
modifying, via the internal proxy, the daemon command and forwarding the modified daemon command to a container daemon.

9. The computer-implemented method of claim 8, comprising:
receiving, via the internal proxy, data from the container daemon in response to the modified daemon command;
modifying the data to generate modified data; and
forwarding the modified data to the container.

10. The computer-implemented method of claim 8, comprising sending container functionality to a computing device via an external proxy.

11. The computer-implemented method of claim 8, wherein intercepting the daemon command comprises monitoring a proxy endpoint that is shared by a plurality of tenants.

12. The computer-implemented method of claim 8, wherein intercepting the daemon command comprises monitoring a dedicated endpoint that is dedicated to a single tenant.

13. The computer-implemented method of claim 8, wherein modifying the daemon command comprises translating between a container view and a host view of the container.

14. The computer-implemented method of claim 8, comprising mapping a tenant to the container.

15. The computer-implemented method of claim 8, comprising mapping a tenant to a plurality of containers comprising the container.

16. A computer program product for container daemon access, the computer program product comprising a computer-readable storage medium having program code embodied therewith, wherein the computer readable storage medium is not a transitory signal per se, the program code executable by a processor to cause the processor to:
receive a daemon access policy;
intercept a daemon command from a container;
detect that the container is allowed access to a container daemon based on the daemon access policy;
generate a modified daemon command and forward the modified daemon command to the container daemon;
receive data in response to the modified command;
modify the data to generate a modified data; and
forward the modified data to the container.

17. The computer program product of claim 16, comprising program code executable by the processor to filter events belonging to other containers.

18. The computer program product of claim 16, comprising program code executable by the processor to translate between a container view and a host view of the container.

19. The computer program product of claim 16, comprising program code executable by the processor to map a tenant to the container.

20. The computer program product of claim 16, comprising program code executable by the processor to map a tenant to a plurality of containers comprising the container.

* * * * *